Aug. 14, 1928.　　　　　　　　　　　　　　1,680,527
A. G. F. KUROWSKI
TYPEWRITING MACHINE
Filed Oct. 10, 1925

Inventor:
Alfred G. F. Kurowski
by B. C. Stickney
Attorney

Patented Aug. 14, 1928.

1,680,527

UNITED STATES PATENT OFFICE.

ALFRED G. F. KUROWSKI, OF BROOKLYN, NEW YORK, ASSIGNOR TO UNDERWOOD ELLIOTT FISHER COMPANY, OF NEW YORK, N. Y., A CORPORATION OF DELAWARE.

TYPEWRITING MACHINE.

Original application filed August 17, 1923, Serial No. 657,870, now Patent No. 1,597,321, dated August 24, 1926. Divided and this application filed October 10, 1925. Serial No. 61,858.

This invention relates to cylindrical platens for typewriting machines, and its object is to produce an improved platen of a kind which offers a surface to give clear-cut type-impressions, and in which the type impact is deadened so as to lessen the noise incidental to the type striking the platen surface.

The platen may include an outer sheath assembled over a moulded core of plastic material having embedded therein a pre-assembled re-enforcing framework that includes rods arranged longitudinally of the core and to which the platen heads are secured and a rod-spacing and rod-bracing member between the two ends of the core. The core may have a relatively large hollow center with a stiffening rib across the hollow center midway between the ends of the core, and through the center of which rib the platen-shaft passes for holding the latter against the tendency to vibrate. The embedded framework re-enforces the rib and also establishes a brace for the rods.

This is a division of my application, Serial No. 657,870, filed August 17, 1923 (now Patent No. 1,597,321, dated August 24, 1926).

Other features and advantages will hereinafter appear.

In the accompanying drawings.

Figure 1:
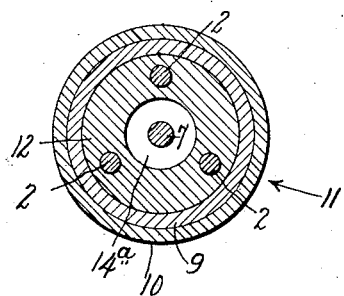
Figure 1 is a sectional elevation of the platen on the line A—A of Figure 2.
Figure 2:
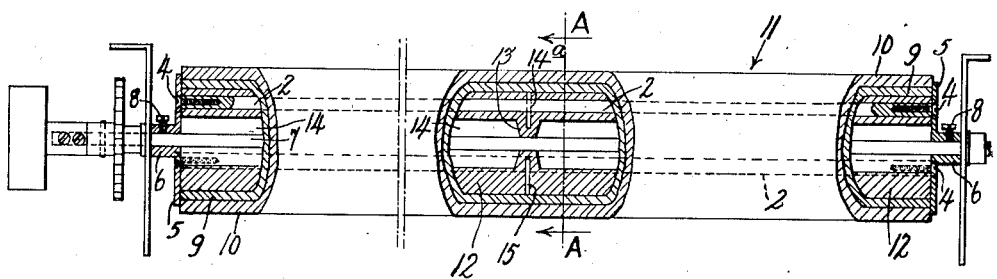
Figure 2 is a front elevation with parts broken away to show the interior section of the novel platen.

The core 12 may be cast of plastic material, such as linoleum, or any other material having similar physical properties, which has the necessary resilience and is at the same time light, tough and workable. The core may have moulded therein three spaced aluminum tie-rods 2, and may be provided with circular metallic end plates or platen heads 5 secured by screws 4, passing through the end plates 5, and threaded into the ends of the tie-rods 2.

The end plates or platen heads 5 may be provided with hubs 6, with central openings through which the platen-axle 7 may extend and be secured thereto by means of set-screws 8 threaded in the hubs.

The core may also have a hollow center 14 and an inwardly-extending shaft-supporting rib or flange 13 midway between the ends of the core. A metal re-enforcing piece or disk 15 may be embedded in the rib to brace the rods and the rib, the rods passing through holes 14$^a$ in the piece 15. The rods 2 are assembled within the holes 14$^a$ in the disk 15 to form a built-up skeleton-frame around which the core may be formed.

The core may be moulded oversize and turned down to the desired diameter to form a smooth surface, or pressed to exact size so that a cylindrical cover 11 can be pushed over it. The cylindrical cover 11 includes an inner part 9 made of a flexible, resilient material, like soft rubber, and an outer shell 10 of firmer material, like semi-hard rubber ground to give the exact size and surface finish.

The completed platen when used will give as clear typewriting as does the ordinary platen, since it has exactly the same sort of a surface to support the work-piece while taking the type-impressions. The inner part 9, because of its flexibility and resiliency, will deaden the impact blow, so as to lessen the noise due to the type striking the platen surface. The inner plastic core 12 will aid the inner part 9 to deaden the impact blow, since either resiliently interposes the platen cover and the axle, and, in addition, will in a large measure absorb the vibration caused by the impact, so that it will not be transmitted to the frame of the machine. Thus a typewriting machine when used with the above-disclosed simply-constructed platen will give clear-cut type-impressions, and the noise, incidental to the impact due to typing, will be greatly reduced.

Variations may be resorted to within the scope of the invention, and portions of the improvements may be used without others.

Having thus described my invention, I claim:

1. A platen having a substantially hard cylindrical outer shell forming a suitable surface to give clear-cut type-impressions, and a relatively resilient plastic core to deaden the impact, to absorb the vibration and to lessen the noise incidental to the type striking the platen surface, including a pre-assembled re-enforcing framework around which the core is moulded to form a hollow center and a re-enforcing rib midway between the ends thereof to support the middle portion of the platen.

2. A revoluble platen for a typewriting machine having an axle on which the platen is mounted and including a substantially hard cylindrical outer shell having a surface suitable for making clear-cut type-impressions, and a relatively resilient plastic core interposed within said outer shell to deaden the impact, to absorb the vibration and to lessen the noise incidental to the type striking the platen surface, including a pre-assembled re-enforcing framework around which the core is moulded to form a hollow center and a re-enforced rib midway between the ends thereof for bracing the middle portion of the shell and for holding the axle passing therethrough against the tendency to vibrate.

3. A platen comprising a cylindrical outer cover having a surface shell of substantially hard, unyielding non-metallic material to form a support for a work-piece to give clear-cut type-impressions, and having an inner part composed of relatively soft, resilient, non-metallic material to deaden the impact and to lessen the noise incidental to the type striking the surface shell and firmly attached therein, a core of molded linoleum, or the like, having embedded therein, in spaced relation, light-weight metallic tie-rods, end plates to which the tie-rods are fastened, said core having a hollow center and an inwardly-extending supporting rib midway between the ends thereof, and a metallic re-enforcing piece embedded in said rib to brace the rods and rib.

4. A platen having an outer typing surface supported by a hollow plastic core, said core having a pre-assembled re-enforcing frame embedded therein, and formed with a hollow center divided into compartments by a partition-wall for breaking up the sound within the core.

5. A typewriter-platen having an outer typing surface supported by a plastic shock and noise absorbing core, said core having a re-enforcing frame around which the core is moulded and formed with a hollow center divided into sound-absorbing compartments, by a re-enforced moulded web that also re-enforces the center of the core to support the platen.

6. A typewriter platen comprising a molded cylindrical core, tie-rods cast therein, end plates for the platen to which the tie-rods are securely fastened, an axle for the platen on which the end plates are rigidly mounted, said core having a hollow center and an inwardly-extending supporting rib midway between the ends thereof for bracing the platen and for holding the axle which passes therethrough against the tendency to vibrate, a metallic re-enforcing piece embedded within said rib to brace the tie-rods and the rib, and a cylindrical cover fitted over said core comprising a yieldable inner portion and a relatively hard outer shell, the latter having a suitable platen surface; said core and yieldable inner portion of the cover forming a light-weight absorbing medium for the sound-vibrations caused by the type striking the platen surface.

7. A noise-absorbing platen having a relatively thin outside shell of material suitable for the platen surface, an inner shell adjoining the outer one of yieldable material suitable for deadening the impact caused by the type striking on the platen surface, and a relatively light-weight, molded, hollow, resilient core having an inwardly-extending cast rib midway between the ends thereof supporting said shells to aid in deadening the impact due to the type striking the platen and to absorb the sound-vibrations incidental thereto.

8. A typewriter-platen having an outer typing surface supported by a plastic sound-deadening core, said core having a built-up frame of re-enforcing parts composed of rods disposed longitudinally of the core and assembled to a rod-spacing and rod-bracing member to form a frame, around which the core is moulded.

9. A typewriting machine having an outer typing surface supported by a plastic sound-deadening core, said core having a built-up frame of re-enforcing parts composed of rods disposed longitudinally of the core and assembled to a rod-spacing and rod-bracing member to form a framework, around which the core is moulded, the ends of the rods furnishing means for securing a platen-head to each end of the core.

ALFRED G. F. KUROWSKI.